United States Patent [19]
Pan et al.

[11] Patent Number: 5,555,330
[45] Date of Patent: Sep. 10, 1996

[54] WAVELENGTH DIVISION MULTIPLEXED COUPLER WITH LOW CROSSTALK BETWEEN CHANNELS AND INTEGRATED COUPLER/ISOLATOR DEVICE

[75] Inventors: Jing-Jong Pan; Ming Shih, both of Milpitas; Jingyu Xu, San Jose, all of Calif.

[73] Assignee: E-Tek Dynamics, Inc., San Jose, Calif.

[21] Appl. No.: 361,610

[22] Filed: Dec. 21, 1994

[51] Int. Cl.⁶ .................................................. G02B 6/26
[52] U.S. Cl. .................... 385/39; 385/11; 385/14; 372/703; 359/494
[58] Field of Search ........................... 385/39, 11, 14, 385/15, 74; 372/703; 359/489, 485, 487, 488, 494, 495, 497, 499

[56] References Cited

U.S. PATENT DOCUMENTS

| | | | |
|---|---|---|---|
| 5,082,343 | 1/1992 | Coult et al. | 385/34 |
| 5,134,621 | 7/1992 | Marshall | 372/703 |
| 5,315,431 | 5/1994 | Masuda et al. | 372/703 |

FOREIGN PATENT DOCUMENTS

| | | | |
|---|---|---|---|
| 2-248919 | 10/1990 | Japan | 372/703 |
| 6-24716 | 2/1994 | Japan | 372/703 |
| 6-27417 | 2/1994 | Japan | 372/703 |

*Primary Examiner*—Rodney B. Bovernick
*Assistant Examiner*—Hemang Sanghavi
*Attorney, Agent, or Firm*—Townsend and Townsend and Crew

[57] ABSTRACT

Wavelength division multiplexed couplers are provided with the ends of input and output optical fibers arranged with respect to GRIN lens so that light from one input fiber is directed toward one output fiber with little crosstalk. An integrated wavelength division multiplexed coupler and isolator device useful for connecting fiberoptic amplifiers to pump lasers is also provided with one version of the WDM coupler. The integrated WDM coupler and isolator device has a tap coupler component created by a planar grating which deflects a small portion of the light through the device toward a photodetector circuit for monitoring purposes. The integrated device also may be combined with a laser diode subassembly can be combined to eliminate a pump laser connection for the fiberoptic amplifier.

13 Claims, 4 Drawing Sheets

WAVELENGTH DIVISION MULTIPLEXED COUPLER WITH LOW CROSSTALK BETWEEN CHANNELS AND INTEGRATED COUPLER/ISOLATOR DEVICE

BACKGROUND OF THE INVENTION

The present invention is related to the field of optical fiber technology and, more particularly, to wavelength division multiplexed (WDM) couplers, and integrated WDM coupler and isolator devices which are highly suitable for fiberoptic amplifiers.

A WDM coupler transfers input signals from a plurality of input information channels to a plurality of output information channels in response to the wavelength of the input signals. A goal for any WDM coupler is that the crosstalk between channels is zero, i.e., that an untargeted output channel is effectively isolated from the signals on a targeted output channel so that none of the signals leak onto the untargeted channel.

Fiberoptic amplifiers boost message signals of one wavelength from the pump signals of another wavelength. These fiberoptic amplifiers, especially erbium-doped fiber amplifiers, are increasingly being used in high-speed fiberoptic transmission links and networks. These types of amplifiers are readily insertable into various points of a network to provide repeater functions, for example, to boost optical signals traveling through many kilometers of optical fibers.

The fiberoptic amplifiers are coupled to lasers which supply the pump signals by wavelength division multiplexed couplers. Since the lasers are susceptible to noise, isolators are also coupled to the amplifier/laser systems to block noise and spurious signals which denigrate the performance of the amplifier. These devices allow a pump laser to be effectively coupled to the fiberoptic amplifier so that a message signal through the fiberoptic amplifier is amplified from the energy supplied from the laser signal.

One partially integrated wavelength division multiplexed coupler and isolator is described in U.S. Pat. No. 5,082,343, which issued Jan. 21, 1992 to D. G. Coult et al. The described device is suitable for coupling to fiberoptic amplifiers. However, the device has several disadvantages. First, the wavelength division multiplexed portion of the device operates inefficiently with undesirably high insertion losses and low isolation losses (large amounts of crosstalk). Secondly, the device is rather large, which has an adverse effect upon the reliability and robustness of the device. Sealing the device, for example, is more of problem with a large device. Furthermore, large size makes the device difficult to insert into various points of a fiberoptic network, as may be desired. Still another disadvantage of the described device is that other desirable components, such as a tap coupler for monitoring signals through the device, must still be linked by fiber splicing. This lowers the performance of the overall system and creates further reliability problems.

The present invention solves or substantially mitigates these problems with a wavelength division multiplexed coupler with high isolation between channels, which additionally is integrable into a compact WDM coupler and isolator device.

SUMMARY OF THE INVENTION

The present invention provides for a high-performance wavelength division multiplexed coupler for coupling two optical fibers. The ends of the two optical fibers are held in a sleeve. The sleeve has a face which is coplanar with the ends of said optical fibers. A quarter-pitch GRIN lens has two end faces and a longitudinal axis between the faces. One of the end faces is close to the sleeve face and a dichroic filter is close to the other GRIN lens end face. The dichroic filter, the GRIN lens longitudinal axis and the ends of the two optical fibers are arranged with respect to each other so that light from a first fiber which is reflected by the dichroic filter passes into said second fiber and light from the second fiber which passes through the dichroic filter leaves the dichroic filter as collimated light.

The present invention also provides for a wavelength division multiplexed coupler and isolator for transmitting optical signals between a first optical fiber to a second optical fiber and blocking optical signals from said second optical fiber to said first optical fiber. The multiplexer and isolator has a housing and collimator subassemblies each mounted to the housing for holding an end of one of the optical fiber in coaxial relationship with a collimator. The collimators for the first and second optical fibers are arranged to form an optical path in the housing between the two collimators. In the optical path is a filter which filters light in the optical path according to the light's wavelength. The filter has a dichroic long-pass filter and an optional bandpass filter. A planar grating in the optical path deflects a small portion of the light away from the optical path. The deflected light is received by a photodetector circuit which is used to monitor the intensity of light in the optical path. Finally, an optical isolator subassembly is placed in the optical path and arranged to transmit light from the first fiber collimator to the second fiber collimator and to block light from the second fiber collimator to the first fiber collimator. The resulting wavelength division multiplexer and isolator is highly integrated into said housing and capable of monitoring optical signals therethrough.

The present invention has another aspect of a wavelength division multiplexer and isolator for transmitting optical signals from a first optical fiber to a second optical fiber and blocking optical signals from the second optical fiber to the first optical fiber. The multiplexer and isolator has a housing and collimator assemblies for the first and second optical fibers. A wavelength-dependent filter, specifically a dichroic long-pass filter, is placed in the optical path between the two collimators as described above. A laser diode mounted in the housing directs its output against the long-pass filter, which reflects the laser output onto the optical path. Also in the optical path is a bandpass filter, which ensures that only light having wavelengths about a desired message wavelength can pass from the first fiber to the second optical fiber, and an optical isolator subassembly which transmits light from the first collimator to the second collimator and blocks light from the second collimator to the first collimator. This arrangement not only integrates the pumping laser into an integrated package, but also increases the performance over the prior art.

BRIEF DESCRIPTION OF THE DRAWINGS

FIG. 2B is an enlarged view of the fiber ends of the WDM coupler in FIG. 2A;

DETAILED DESCRIPTION OF PREFERRED EMBODIMENT(S)

Figure 1A:
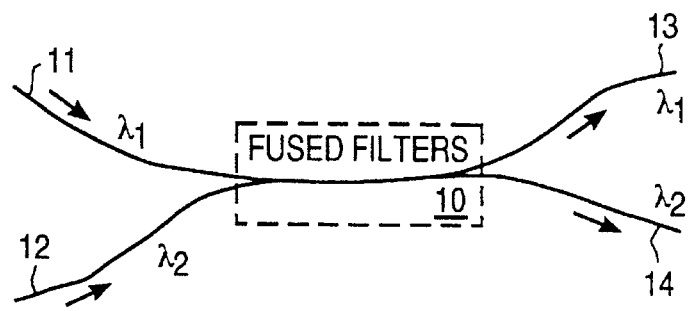
FIG. 1A is a representational diagram of a fused fiber, WDM coupler according to the prior art.

FIG. 1A is a representational diagram of a 2×2, fused WDM coupler found in the prior art. The cladding and core of a pair of optical fibers are fused together to form a WDM coupler 10 enclosed by dotted lines. The coupler 10 has two input fibers 11, 12 and two output fibers 13, 14. The first input fiber 11 carries signals of wavelength $\lambda_1$ and the second input fiber 12 carries signals of wavelength $\lambda_2$. Ideally, only one of the output fibers, say output fiber 13, should carry the signals of wavelength $\lambda_1$, while the other output fiber 14 should carry the signals of wavelength $\lambda_2$, as shown in FIG. 1. Crosstalk occurs if the $\lambda_1$ signals appear on the output fiber 14 or the $\lambda_2$ signals appear on the output fiber 13.

Figure 1B:
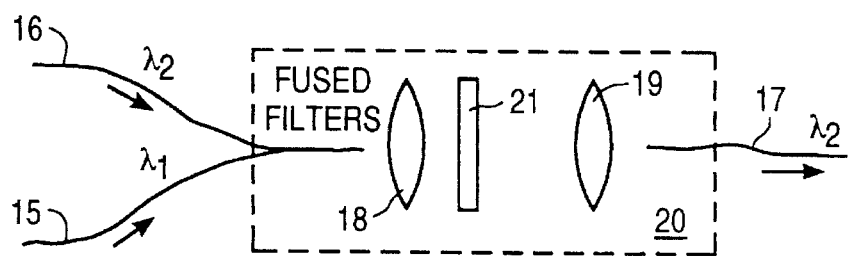

For an integrated wavelength division coupler and isolator as disclosed in the patent mentioned above, the fused WDM coupler is in the form illustrated in FIG. 1B. The coupler 20 (again enclosed by dotted lines) has two input fibers 15, 16 and an output fiber 17. The two input fibers 15 and 16 are fused together and signals from the fused fibers are directed toward a collimator 18. A second collimator 19 refocuses the collimated light signals from the collimator 78 into the output fiber 17. The collimators 18 and 19 are shown as standard lens for purposes of illustration.

One input fiber 15 carries signals of wavelength $\lambda_1$; the second input fiber 16 carries a signals of wavelength $\lambda_2$. A wavelength selective device 21 between the collimators 18 and 19 reflects the light of one of the wavelengths, say $\lambda_1$, and passes the $\lambda_2$ wavelength light. Thus the output fiber 17 carries the $\lambda_2$ signals. The problem with this WDM coupler arrangement is the crosstalk between the fibers 15 and 16 carrying the reflected $\lambda_1$ signals. As explained below, the $\lambda_1$ signal should ideally be reflected into the input fiber 16 only. In reality, some of the $\lambda_1$ signal is reflected back into the input fiber 15; there is crosstalk.

This type of wavelength division multiplexed coupler is generally described in U.S. Pat. No. 5,082,343 noted above. Besides crosstalk, the problem with this coupler is that the insertion losses and polarization dependent losses of such couplers are high.

Figure 2A:
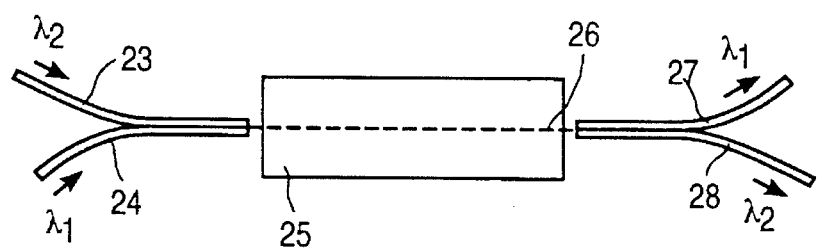
FIG. 2A is a representational diagram of a WDM coupler according to the present invention.

FIG. 2A is a general illustration of a 2×2 WDM coupler of much higher performance, according to the present invention. The coupler combines the tapered ends of two input optical fibers 23, 24, which are not fused together, the tapered ends of two output fibers 27, 28 and a half-pitch GRIN (GRaded INdex) lens 25. The positions of the ends of the fibers 23, 24 and 27, 28 are explained with reference to a longitudinal axis 26 of the GRIN lens 25. In an half-pitch GRIN lens a point source of light at one GRIN lens end surface on the longitudinal axis 26 appears as a point of light at the other end surface of the GRIN lens on the longitudinal axis. If the light source at one end surface is removed slightly from the longitudinal axis in one direction, the light appears at the other end surface removed slightly from the longitudinal axis but in the opposite direction.

Figure 2B:
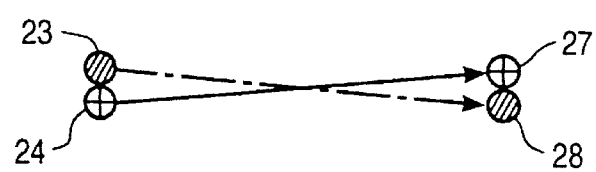
FIG. 2B is a variation of the WDM coupler of FIG. 1B.

In the present invention the ends of the fibers 23 and 24 are arranged with respect to one end surface of the GRIN lens 25 so that each end is slightly removed from the longitudinal axis 26. Correspondingly, the ends of the fibers 27 and 28 are also arranged with respect to the other end surface of the GRIN lens 25 so that each fiber end is slightly removed from the longitudinal axis 26 and opposite to an input fiber. The result is that light from one input fiber is received by an output fiber opposite the input fiber (with respect to the longitudinal axis 26). In FIG. 2B solid circles and "+"s indicate how the light signals are transferred between the input and output fibers. Light with wavelength $\lambda_1$ from the input fiber 24 is received by the output fiber 27 and light with wavelength $\lambda_2$ from the input fiber 23 is received by the output fiber 28.

It should be noted that the explanation above of the positions of the fiber ends with respect to the longitudinal axis 26, as called for by the theoretical operation of the GRIN lens, is an idealization. Empirically, it has been found that fine adjustments may still be required to achieve maximum performance of the WDM coupler.

Figure 3A:
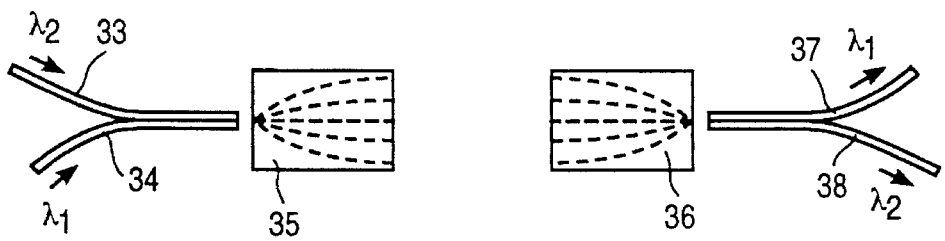
FIG. 3A is a representational diagram of another embodiment of the WDM coupler according to the present invention.

FIG. 3A illustrates another embodiment of a WDM coupler according to the present invention. A half-pitch GRIN lens can be formed by two quarter-pitch GRIN lenses. The FIG. 3A coupler is simply the codpler in FIG. 2A with the half-pitch GRIN lens 26 split into two quarter-pitch GRIN lenses 35 and 36. The two quarter-pitch GRIN lenses 35 and 36 may be separated as shown in FIG. 3A. The light from each end of the input fibers 33, 34 is collimated by the quarter-pitch GRIN lens 35 and recollimated, i.e., refocussed, by the quarter-pitch GRIN lens 36 to the ends of the respective output fibers 38, 37, for all practical purposes. The action of the GRIN lenses 35 and 36 upon light rays is illustrated by dotted lines in each of the GRIN lenses. Of course, the paths of the light rays from each input optical fiber 33 and 34 are slightly different from the other to achieve the separation of the refocussed light at the ends of the output fibers 37 and 38. The result is that the WDM coupler operates in the same manner as the coupler in FIG. 2A.

While termed wavelength division multiplexer couplers, the WDM couplers described with respect to FIGS. 2A–B and 3A might also be considered as simple couplers since an input fiber is coupled to an output fiber by the arrangement of the fibers with respect to each other (and the intervening GRIN lens(es)), rather than as a function of a signal's wavelength.

Figure 3B:
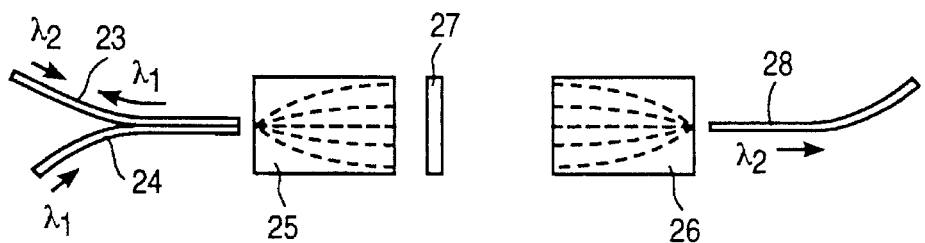
FIG. 3B is a variation of the WDM coupler of FIG. 3A.

FIG. 3B illustrates a WDM coupler which operates in the same manner as the prior art WDM coupler of FIG. 1B. The wavelength of a signal is also used to direct the signal. The coupler, according to the present invention, has the ends of two input fibers 23 and 24 near an end surface of a quarter-pitch GRIN lens 25. The input fiber 23 carries light of wavelength $\lambda_2$ and the input fiber 24 carries light of a shorter wavelength $\lambda_1$. A single output fiber 28 is placed near an end surface of a second quarter-pitch GRIN lens 26. Between the two GRIN lens is a long-pass filter, a dichroic filter 27, which has a cutoff wavelength, i.e., the wavelength above which the filter 27 passes light through and below which the filter blocks by reflecting the light back. The cutoff wavelength is set below the wavelength $\lambda_2$ on the input fiber 23 and above the wavelength $\lambda_1$ on the input fiber 24.

In the manner explained above, the ends of the input fibers 23 and 24 are arranged with respect to the longitudinal axis of the GRIN lens 25 so that light from the input fiber 24 reflected back by the dichroic filter 27 is refocussed by the GRIN lens 25 at the end of the input fiber 23. A WDM coupler is formed by the ends of the fibers 23, 24, the quarter-pitch GRIN lens 25 and the dichroic filter 27. The light from the input fiber 24 is sent to the input fiber 23 and the light from the input fiber 23 is passed forward through the filter 27 as collimated light.

The GRIN lens 26 recollimates the light from the input 23 by refocussing the light to the end of the output fiber 28. Other collimators, such as standard lenses, may also be used in place of the GRIN lens 26. A GRIN lens is believed to be the best choice from factors, such as size, cost, performance and reliability considerations.

Figure 4A:
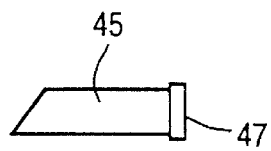
FIG. 4A–4D illustrates some of the steps of manufacturing some of the components of the wavelength division multiplexed coupler of FIG. 3B.

FIGS. 4A–4D illustrate some of the steps useful in the manufacture of the WDM couplers shown in FIGS. 2A, 3A and, in particular, 3B. In FIG. 4A, a long-pass filter 47, typically a dichroic mirror filter, is attached to the flat face of a GRIN lens 45. Alternatively, dichroic filter material can be deposited directly onto the GRIN lens surface. The filter 47 could also be mounted separately from the GRIN lens 45. This is considered less desirable due to the simplicity of the previous alternatives.

The GRIN lens 45 is quarter-pitch in theory, but in practice it has been found that 0.23 pitch offers better collimating performance. While standard lenses could also be used as collimators, it has been found that GRIN lenses provide better performance, easier manufacturing and greater durability. The back face of the GRIN lens 45 is polished at an angle, shown here at an exaggerated angle. Typically, the angle polish is 8°–12° from a flat surface perpendicular to the longitudinal axis of the GRIN lens 45.

Figure 4B:
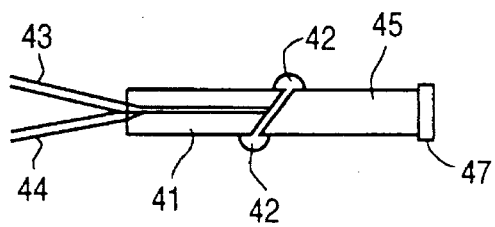

The ends of two optical fibers 43 and 44 have their outer coatings removed, and the core and cladding at the ends of these fibers may be tapered or left untapered. To taper the fibers ends, the fiber ends are repeatedly dipped into a buffered HF solution. The two ends of the fibers are then inserted into a quartz glass sleeve 41 in the form of a capillary tube which has a central opening sufficiently large to accept the ends of the two fibers 43 and 44. The ends of the two fibers extend beyond the end of the sleeve 41 and are cut flush against the forward face of the sleeve. The forward face of the sleeve 41 is then polished at the same angle of the back face of the GRIN lens 45. The front face of the glass sleeve 41 and the back face of the GRIN lens 45 are then brought together in close proximity with the angle of their faces in parallel and reciprocal relationship. Separation distance is 5 to 10 μm. The sleeve 41 and GRIN lens 45 are held in place by a UV-curved epoxy 42. This is illustrated in FIG. 4B.

Figure 4C:
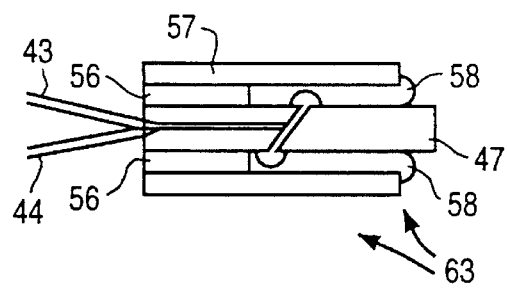

As shown in FIG. 4C, the sleeve 41 is placed in a quartz cylinder 56 which holds the ends of the optical fibers 43 and 44, the sleeve 41 and the GRIN lens 45 centered in a cylindrical housing 57 of stainless steel which forms the outer covering of a collimator subassembly 63. Epoxy 58, such as Model 4481 from Electro-Lite Company, Danbury, Conn., holds the subassembly 63 in place. Antireflection coatings are deposited on the forward face of the sleeve 41 and the back face of the GRIN lens 45. An antireflection coating is also deposited on the exposed face of the long-pass filter 47. In the case where the filter 47 is separated from the GRIN lens 45, both faces of the dichroic filter are coated.

Figure 4D:
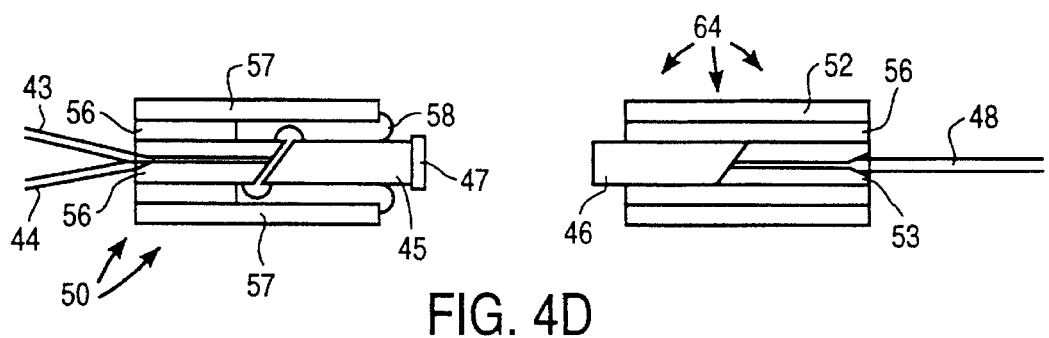

As shown in FIG. 4D, a second collimator subassembly 64 is similarly formed by another quarter-pitch GRIN lens 46 which has its back face similarly angle-polished and in reciprocal relationship to the angle-polished front face of a quartz sleeve 50 which holds the end of an optical fiber 48. A quartz tube 51 holds the GRIN lens 46 and the optical fiber 48 in place in a cylindrical subassembly holder 52. As shown in FIG. 4D, the front faces of the two GRIN lens 45 and 46 face each other to form an optical path. The subassemblies 63 and 64 form the WDM coupler of FIG. 3B.

More detailed information on the manufacture of these GRIN lens/optical fiber subassemblies, and isolator core subassemblies discussed below, may be found in U.S. Pat. No. 5,208,876 entitled, "AN IMPROVED OPTICAL ISOLATOR", which issued on May 4, 1993 to J. J. Pan and assigned to the present assignee.

The described wavelength division multiplexer coupler has a high performance. Insertion loss has been found to be 0.2 dB, compared to 0.5 to 1.0 dB for fused fiber WDM couplers, and the polarization dependent losses have been found to be 0.01 dB, compared to 0.1 db for the fused fiber couplers. Crosstalk is very low; isolation losses exceed 30 dB compared to 18 dB for the fused fiber couplers. For the couplers in FIGS. 1B and 3B, the isolation loss is defined as the ratio of the intensity of light from one input fiber over the intensity of light reflected back into the other input fiber.

Figure 5:
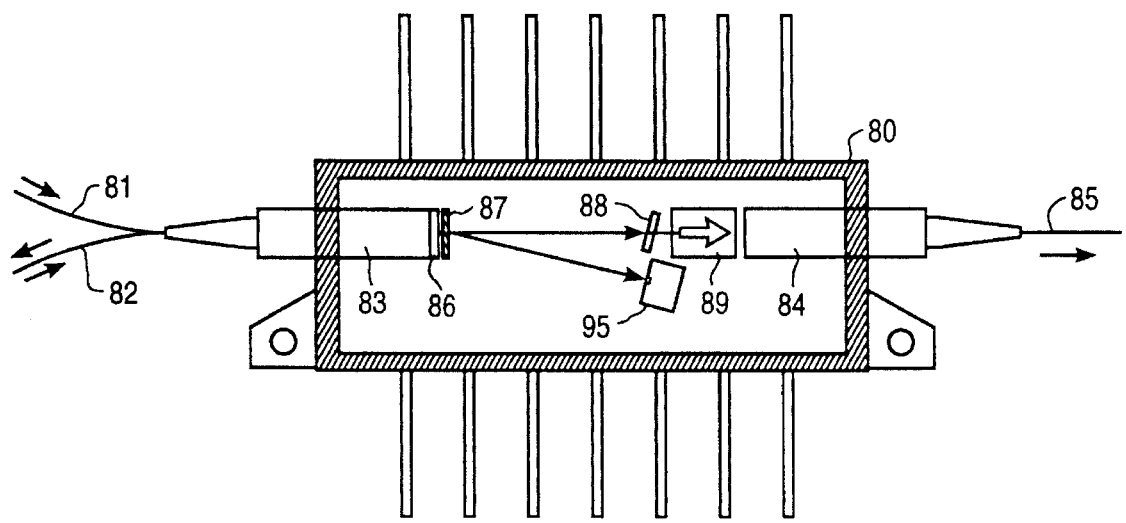
FIG. 5 is a diagram of one embodiment of a wavelength division multiplexed coupler and isolator in a forward pumping arrangement according to the present invention.

The WDM coupler of the present invention allows for wavelength division multiplexed coupler and isolator devices which are highly integrated and with excellent performance. FIG. 5 diagrammatically illustrates a wavelength division multiplexed coupler and isolator according to the present invention. The device has a housing 80 which holds collimator subassemblies 83 and 84. The subassembly 83 holds the ends of two optical fibers 81 and 82 and the subassembly 88 holds the end of the optical fiber 85. Each subassembly holds the end of the fiber(s) with a collimating GRIN lens. The subassemblies and collimating GRIN lenses are arranged to form an optical path between each other.

In front of the subassembly 83 and attached to the front of the subassembly is a long-pass, dichroic filter 86. In front of the filter 86 there is an optical tap in the form of a beam splitter 87 which deflects a small part of the light away from the optical path between the two subassemblies 83 and 84. An optional bandpass filter 88 is the next element in the optical path, which has finally an optical isolator core subassembly 89 directly in front of the subassembly 84. The arrow associated with the subassembly 89 indicates the direction along which the subassembly 89 permits light signals to pass. Signals in the opposite direction are blocked.

The integrated wavelength division multiplexed coupler and isolator shown in FIG. 5 operates with a fiberoptic amplifier, typically an optical fiber doped with a rare earth metal, such as erbium (Er), praseodymium (Pr), neodymium (Nd), etc., and a pump laser. The optical fiber 81 carries output signals from the pump laser (not shown in the drawing) into the coupler and isolator device. The second optical fiber 82 carries amplified information, i.e., message signals from the rare earth metal doped fiber (also not shown) into the multiplexed coupler and isolator and laser pump signals from the laser and the multiplexed coupler and isolator device.

The amplified light signals from the optical fiber 82 are collimated by the subassembly 83 which directs the light at the long-pass filter 86, a dichroic mirror filter. At the same time, the laser pump generates light signals at a wavelength below the wavelength of the message signal on the optical fiber 82. After the light from the optical fiber 82 is collimated by the subassembly 83, the light is directed against the long-pass filter 86. The long-pass filter 86 has a cutoff wavelength set below the wavelength of the message signal and above the laser pump wavelength. Hence, the laser light from the optical fiber 81 is reflected back by the long-pass filter 86 into the optical fiber 82 to the fiberoptic amplifier. The amplifier, which operates independently of the direction of the light passing through, thus amplifies the message signals passing into the wavelength division multiplexed coupler and isolator.

Since the wavelength of the message signal is above the cutoff wavelength of the long-pass filter 86, the signal passes through to the beam splitter 87. The beam splitter in this embodiment is a simple planar grating which directs most of the light, approximately 97% of the light, along the optical path between the subassemblies 83 and 84.

The light along the optical path passes through an optional bandpass filter 88 which filters out the light signals at frequencies other than that of the message signals. The bandpass filter 88 may be left out if the message signal is sufficiently "clean" to pass to the output fiber 85. It has been found that a bandpass filter increases the insertion loss of the wavelength division multiplexed coupler and isolator slightly, approximately 0.2 dB.

The filtered light then passes into the isolator core subassembly 89, which is formed by two wedge-shaped birefringent crystal polarizers on either side of a Faraday rotator. The subassembly 89 blocks any light travelling along the optical path from the collimator subassembly 84 toward the first collimator subassembly 83. From the isolator subassembly 89, the light is then sent into the subassembly 84 which recollimates the light into a point focused at the end of the optical fiber 85.

The grating 87 also deflects a small portion of the light away from the optical path between the subassemblies 83 and 84 toward a photodetector circuit 95 in the form of an integrated circuit having a photodiode. The photodetector circuit 95 is responsive to the intensity of the light in the optical path. Hence, the photodetector circuit 95 monitors the amount of light from the subassembly 83 to the subassembly 84. This provides a simple monitoring of the operations of the fiberoptic amplifier on the fiber 82 and the laser pump on the fiber 81.

Figure 6A:
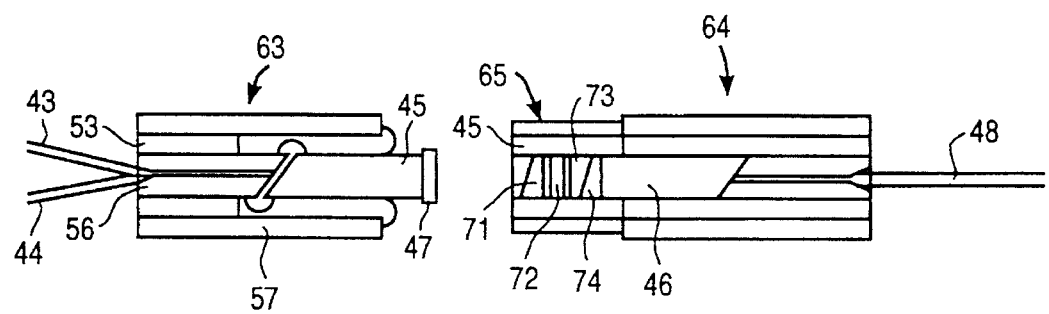
FIGS. 6A–6B illustrate some steps in addition to the steps of FIGS. 4A–4D to manufacture the wavelength division multiplexed coupler and isolator.

FIG. 6A illustrates how an isolator core subassembly, such as that described above, is constructed with the collimator subassembly of FIGS. 4A–4D. An optical isolator subassembly 65 has two birefringent crystal polarizers 71 and 73 on either side of a Faraday rotator 72. These three elements are held in place in a glass cylinder 75. Around the cylindrical holder 75 is an annular magnet 74 which functions with the Faraday rotator 72. Materials which may be used for the rotator 72 include garnet doped with impurities or, YIG, and TGG. However, the present invention also contemplates using CdMnTe (more precisely, $Cd_{1-x}Mn_xTe$) or Hg-doped CdMnTe. Materials heretofore used as Faraday rotators in optical isolators operate very well at wavelengths from 1200 to 1600 nm. However, it is often desirable to use lasers at shorter wavelengths, specifically, 980 and 1017 nm. CdMnTe (Cadmium manganese tellurium), or Hg-doped CdMnTe, has a large Verdet constant which permits the Faraday rotator to be small enough to fit into the integrated wavelength division multiplexed coupler and isolator, as contemplated by the present invention, and to effectively operate at such shorter wavelengths. The result is an integrated coupler and isolator which can operate effectively with fiberoptic amplifiers energized by pump lasers operating at wavelengths between 900 to 1200 nm.

For example, a message signals at 1550 nm wavelength can use shorter wavelengths from the pump laser to drive the coupled fiberoptic amplifier. If the pump laser generates an output at 1480 nm, say, then standard Faraday rotator materials can be used in the optical isolator subassembly 24. If a pump laser at 980 or 1017 nm is desired, a Faraday rotator of CdMnTe should be used.

Of course, CdMnTe or Hg-doped CdMnTe may also be used for a Faraday rotator in a separate isolator device as described in U.S. Pat. No. 5,208,876 noted above.

Figure 6B:
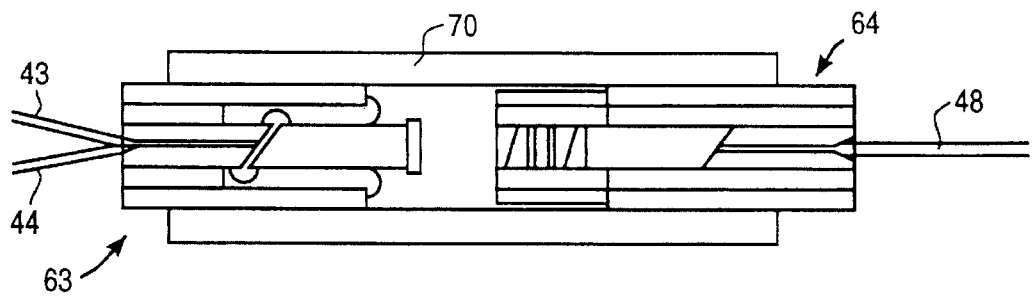

FIG. 6B illustrates the two collimator subassemblies 63 and 64 in the stainless steel housing 70 without the grating 22 and bandpass filter 23. Also omitted is the photodetector circuit 25. The completed device can be integrated in a commercially available 14-pin butterfly package, approximately 21 mm long and 13 mm wide, for miniaturization. The package is hermetically sealed by a combination of laser and solder welding for increased integrity and reliability.

Figure 7:
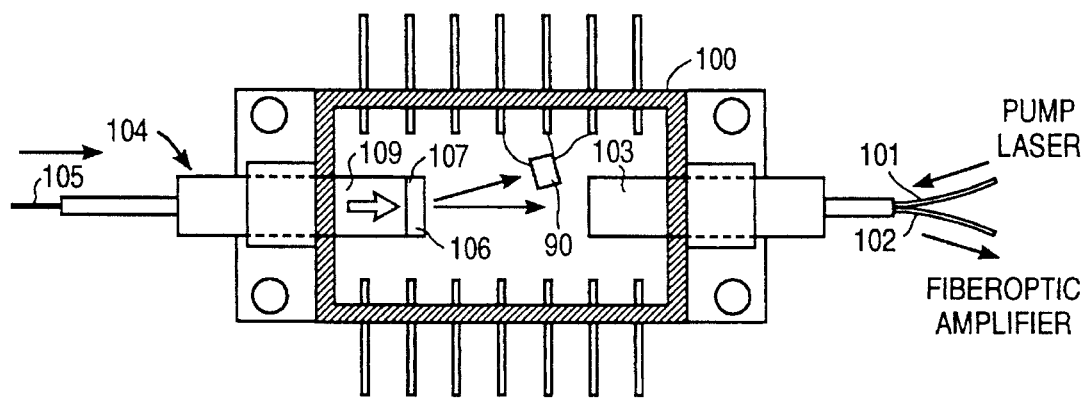
FIG. 7 is a diagram of the wavelength division multiplexed coupler and isolator of FIG. 5 in a backward pumping arrangement according to the present invention.

The integrated coupler and isolator device is a so-called "forward" pumping arrangement with the fiberoptic amplifier, which is placed ahead of the device. The device can also be rearranged so that it can be in a "backward" pumping arrangement with the fiberoptic amplifier, as shown in FIG. 7. In this case the fiberoptic amplifier is connected below or downstream of the integrated coupler and isolator. A message signal is sent from an optic fiber 105 to the integrated coupler and isolator device in a housing 100. The end of the fiber 105 is held by a collimator subassembly 104, as described above, to which is attached a core isolator subassembly 109. At the end of the subassembly 109 is a long-pass filter 107 and a grating beam deflector 106. As described previously, the deflector 106 partially deflects some of the light from the optical path toward a photodetector circuit 90, which monitors the strength of the optical signals through the integrated device. The undeflected light is received by a collimator subassembly 103 which holds the spliced ends of the optical fibers 101 and 102.

Operationally the optical fiber 101 is connected to a pump laser which sends its output into the integrated coupler and isolator. After being collimated by the subassembly 103 the laser light is sent through the beam deflector 106 and reflected back by the long-pass filter 107. At the same time the message signals are sent to the integrated coupler and isolator from the optical fiber 105. After passage through the subassembly 104, the message signals combined with the reflected laser signals travel along the optical path toward the subassembly 103. These combined signals are partially deflected toward the photodetector circuit 90 for a monitor of the message signals and the laser signals.

The photodetector circuit in integrated coupler and isolator can be arranged with respect to the beam deflector anywhere in the optical path between the collimator subassemblies. However, if the long-pass filter 107 is placed against the end of the subassembly 103, the photodetector 90 only monitors the strength of the unamplified message signals and not the pump laser signal. To avoid this, the photodetector circuit in integrated coupler and isolator can be arranged with respect to the beam deflector so that the light monitored has an intensity related to the power of the message signal laser. In the forward pump arrangement of FIG. 5, the monitored light is the light from the rare earth metal doped fiber which is boosted by the pump laser output. In the backward pump arrangement of FIG. 7, the light directly from the input message signal and the pump laser signal is monitored.

Figure 8:
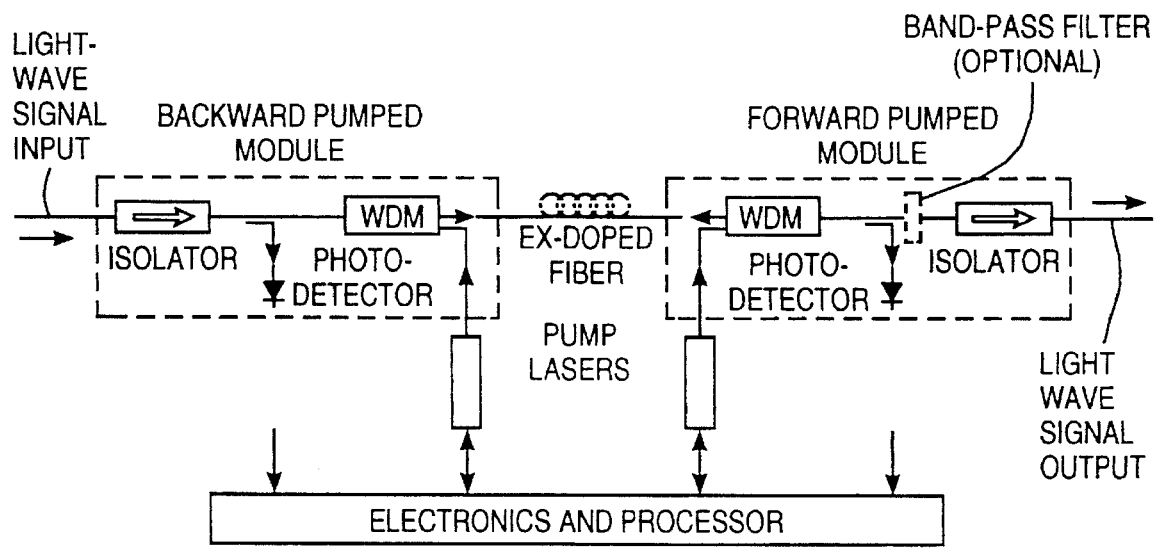
FIG. 8 illustrates how the integrated wavelength division multiplexed coupler and isolator of FIGS. 5 and 7 can be used in a double pumping arrangement according to the present invention.

Of course, the integrated coupler and isolator devices can also be used combination with each other. FIG. 8 illustrates a combined forward and backward pumping arrangement for an erbium-doped fiberoptic amplifier between the two integrated devices.

The embodiments of the present invention shown in FIGS. 5 and 7 have the pump laser delivering its signal to the device through an optical fiber. Despite the improved performance of the wavelength division multiplexed couplers described here, the combination of optical fibers inherently causes some insertion loss and, of significance in recent years, some polarization dependent losses. That is, depending upon the state of polarization of a signal in one of the spliced optical fibers, the loss in transmission to the other fiber is dependent upon the polarization of the light signal. This is unacceptable if the state of polarization varies in the information channel.

Figure 9:
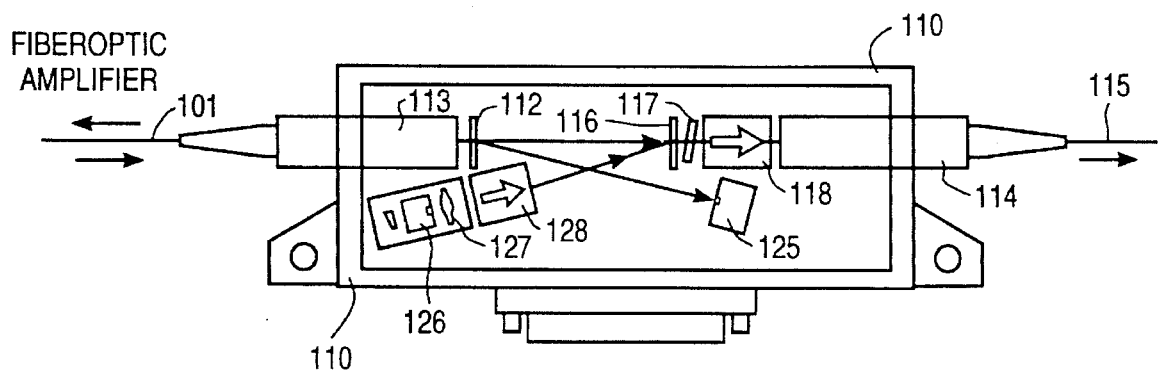
FIG. 9 is a representational diagram of another embodiment of a wavelength division multiplexed coupler and isolator in a forward pumping arrangement according to the present invention.

The embodiment of the present invention shown in FIG. 9 eliminates this problem. The wavelength division multiplexer and coupler has a metallic (suitable materials include Kovar and Invar, or stainless steel) housing 110 with a first collimator subassembly 113 and a second collimator subassembly 114. Each subassembly 113, 114 holds the end of one optical fiber 111, 115 respectively. Between the two facing ends of these subassemblies 113 and 114 which define an optical path between them are a beam splitter 112, a long-pass filter 116, and the optional bandpass filter 117 and an optical isolator subassembly 118. These elements are the same as previously described. There is also a photodetector circuit 125 which receives the partially deflected light from the optical path by the beam splitter 112, a planar grating.

Instead of an optical fiber from a pump laser, the housing 110 holds a laser subassembly having a laser diode 126 and a collimator 127. Light from the laser diode 126 is collimated by the collimator 127, in this case, an aspheric lens. The light passes through a second optical isolator core subassembly 128 and is directed against the surface of the dichroic long-pass filter 116. The dichroic long-pass filter 116, is arranged such that the light from the laser is directed in the reverse direction of the optical path toward the deflector 112 into the collimator subassembly 113 and the input fiber 111. This permits the fiber amplifier connected to the optical fiber 111 to be pumped to amplify the information signal into the device.

A particular adaptation of the laser diode 126, collimator 127 and isolator subassembly 128 is described in a co-pending patent application, U.S. Ser. No. 08/361,604, entitled, "MINIATURIZED LASER DIODE ASSEMBLY", filed of even date by J. J. Pan and assigned to the present assignee. This adaptation is very compact and highly suited for insertion into the tight confines of the housing 30.

While the above is a complete description of the preferred embodiments of the present invention, various alternatives, modifications and equivalents may be used. It should be evident that the present invention is equally applicable by making appropriate modifications to the embodiment described above. For example, it should be evident from the WDM couplers described above that more input and output fibers may be connected together according to the teachings of the present invention. Therefore, the above description should not be taken as limiting the scope of invention which is defined by the metes and bounds of the appended claims.

What is claimed is:

1. A wavelength division multiplexed coupler and isolator for transmitting optical signals between a first optical fiber to a second optical fiber and blocking optical signals from said second optical fiber to said first optical fiber, said multiplexer and isolator comprising a housing;

a first subassembly mounted to said housing for holding an end of said first fiber in coaxial relationship with a first collimator, said first collimator collimating light from said first fiber;

a second subassembly mounted to said housing for holding an end of said second fiber in coaxial relationship with a second collimator, said second collimator refocussing collimated light at said end of said second fiber, said first and second collimators forming an optical path therebetween in said housing;

means for filtering light in said optical path responsive to the wavelength of said light;

means for partially deflecting light away from said optical path;

means in said housing for receiving said partially deflected light for monitoring the intensity of light in said optical path; and an optical isolator subassembly in said optical path, said isolator subassembly transmitting light in said optical path from said first collimator to said second collimator and blocking light in said optical path from said second collimator to said first collimator;

whereby said wavelength division multiplexed coupler and isolator is integrated into said housing and capable of monitoring optical signals therethrough.

2. The integrated coupler and isolator of claim 1 wherein said light filtering means comprises a long-pass filter in said optical path.

3. The integrated coupler and isolator of claim 2 wherein said long-pass filter comprises a dichroic mirror filter.

4. The integrated coupler and isolator of claim 2 wherein said light filtering means further comprises a bandpass filter in said optical path.

5. The integrated coupler and isolator of claim 1 wherein said partially deflecting means comprises a planar grating in said optical path.

6. The integrated coupler and isolator of claim 5 wherein said receiving means comprises a photodetector circuit in said housing and removed from said optical path, said photodetector receiving light signals from said grating.

7. The integrated coupler and isolator of claim 6 wherein one of said first and second subassemblies holds an end of a third optical fiber in coaxial relationship with a collimator, said third optical fiber connected to a pump laser.

8. The integrated coupler and isolator of claim 7 wherein said first subassembly holds said end of said third optical fiber, and said filtering means is located in said optical path with respect to said deflecting means so that said deflecting means deflects light travelling from said first optical fiber to said second optical fiber.

9. The integrated coupler and isolator of claim 7 wherein said second subassembly holds said end of said third optical fiber, and said filtering means is located in said optical path with respect to said deflecting means so that said deflecting means deflects light travelling from said first optical fiber to said second optical fiber and light from said third optical fiber reflected by said light filtering means.

10. The integrated coupler and isolator of claim 1 further comprising a light source in said housing directing light against said light filtering means and placing said directed light in said optical path.

11. The integrated coupler and isolator of claim 10 wherein light generating means comprises a laser diode.

12. The integrated coupler and isolator of claim 10 wherein said optical isolator subassembly has a Faraday rotator comprising CdMnTe.

13. The integrated coupler and isolator of claim 12 wherein said Faraday rotator comprises Hg-doped CdMnTe.

\* \* \* \* \*